United States Patent [19]

Barbee

[11] Patent Number: 4,468,650
[45] Date of Patent: Aug. 28, 1984

[54] LOW TIRE PRESSURE ALARM SYSTEM

[75] Inventor: J. Brent Barbee, Nashville, Tenn.

[73] Assignee: Kanetsu Kogyo Kabushiki Kaisha, Nagono, Japan

[21] Appl. No.: 431,590

[22] Filed: Sep. 30, 1982

[51] Int. Cl.³ .......................................... B60C 23/00
[52] U.S. Cl. ..................... 340/58; 73/146.5; 116/34 R; 200/61.22; 200/61.25; 340/52 R
[58] Field of Search ............................ 340/52 R, 58; 200/61.22, 61.25; 116/34 R; 73/146, 146.2, 146.3, 146.4, 146.5, 146.8

[56] References Cited

U.S. PATENT DOCUMENTS

| | | | |
|---|---|---|---|
| 2,731,936 | 1/1956 | Fowler | 340/58 |
| 3,588,815 | 6/1971 | Koonce | 340/58 |
| 3,601,080 | 8/1971 | Nygard | 116/34 R |
| 3,950,726 | 4/1976 | Fujikawa et al. | 340/58 |
| 3,999,431 | 12/1976 | Makarainen | 340/58 |
| 4,048,614 | 9/1977 | Shumway | 340/58 |

Primary Examiner—James J. Groody
Assistant Examiner—Michael F. Heim
Attorney, Agent, or Firm—Graybeal & Cullom

[57] ABSTRACT

A tire pressure alarm system primarily adapted for the monitoring of tire pressure in the pneumatic tires of coaxial dual wheels on a vehicle including a pneumatic cylinder mounted diametrically on the hub of the outboard wheel and having its end portions coupled by fluid hoses to the air valves of the respective inboard and outboard tires. The cylinder includes a reciprocal piston member normally biased to a axial central position defining air detector chambers at opposite ends of the cylinder for communication with the respective air valve stems. The piston member carries a pair of axially spaced switch elements movable with the piston member for actuating switch sensor elements spaced along the cylinder for generating alarm signals corresponding to predetermined tire pressures in the respective inboard and outboard tires. The pneumatic cylinders are substantially centrifugally balanced on the hub of the outboard wheel.

6 Claims, 8 Drawing Figures

LOW TIRE PRESSURE ALARM SYSTEM

BACKGROUND OF THE INVENTION

This invention relates to an alarm system, and more particularly to a low tire pressure alarm system.

It is well known in the art to mount on or about a valve stem of a single pneumatic tire an assembly of a low tire pressure detector and a radio transmitting device. Upon detection of a pressure drop below a predetermined level by the low tire pressure detector, the radio transmitter transmits a radio frequency alarm signal to a receiving antenna of a receiving set, usually mounted in the cab of a vehicle to actuate an alarm to apprise the driver of the corresponding low pressure in the monitored tire.

Another example of a similar type of low tire pressure alarm system in which the radio transmitter and antenna are mounted in a shielded hub casing is disclosed in the prior Fujikawa et al U.S. Pat. No. 3,950,726, issued Apr. 13, 1976. In the Fujikawa et al patent, the tire pressure detector is still located, either adjacent to or connected to the air valve stem, at a radial distance from the rotary axis from the vehicle wheel.

In the Shumway U.S. Pat. No. 4,048,614, issued Sept. 13, 1977, a miniature tire pressure detector and radio transmitter are attached directly to the air valve stem, and located in the air space within the monitored tire.

All of the above low tire pressure alarm systems are designed for single tires on single vehicle wheels, only. Moreover, all of the above detector devices are located radially outward of the rotary axis of the single wheel, and thereby become subjected to substantial centrifugal force, particularly if the vehicles are driven at high speed.

SUMMARY OF THE INVENTION

It is therefore an object of this invention to provide a low tire pressure alarm system particularly adapted for use in monitoring the air pressure in a pair of pneumatic tires on coaxial dual wheels, utilizing a single detector unit coupled to the air valve stems of both dual wheel tires.

Another object of this invention is to provide a low tire pressure alarm system in which the detector unit is mounted on the hub of the vehicle wheel, or on the hub of the outboard vehicle wheel of a dual wheel system, in which the mass of the detector unit and its component parts are substantially concentrically balanced to minimize the effects of centrifugal force.

The tire pressure detector made in accordance with this invention includes an elongated cylinder supporting a reciprocal piston member within the cylinder having longitudinally spaced piston heads defining a first detector air chamber at one end of the cylinder and a second detector air chamber at the opposite end of the cylinder, both of the detector chambers being in fluid communication through flexible conduits or hoses coupled to the corresponding air valve stems of the respective inboard and outboard tires. A pair of movable switch elements fixed to the piston member, and preferably comprising longitudinally spaced magnets, are each designed to move in proximity to, and actuate, a corresponding stationary proximity switch element fixed to the cylinder, when the air pressure in the corresponding detector chamber is low, to generate a corresponding alarm signal.

In the preferred form of the invention, the movable switch elements or magnets have a longitudinally greater spacing than the corresponding spacing between a pair of fixed switch elements, so that as the first magnet arrives at a first operative position in proximity to a first fixed switch element, a first alarm signal is generated to indicate a first low pressure value in one tire, such as the outboard tire. Then as the air pressure continues to decline, the second magnet approaches a second or intermediate fixed switch element in an operative position to generate a second alarm signal to indicate an even lower tire pressure value. Moreover, tire pressure for the other tire, such as the inboard tire, is similarly detected and indicated by a third fixed switch element toward the opposite end of the cylinder when the pressure is reduced in the detector chamber at the opposite end of the cylinder and when the piston member and movable magnet switch elements are moving in the opposite direction. The intermediate switch element may also be utilized to indicate an even lower pressure in the inboard tire.

An air intake valve is mounted in the middle of the cylinder, so that air may be introduced to fill both tires. The air intake valve communicates with an air intake chamber within the cylinder between the piston heads of the piston member. The air intake chamber communicates through ports in the hollow piston member with the detector chambers which are connected to the respective tires.

A bracket is provided for mounting the cylinder diametrically of the hub of the outboard wheel and centrally located relative to the wheel for centrifugal balancing.

DESCRIPTION OF THE PREFERRED EMBODIMENTS

Figure 1:
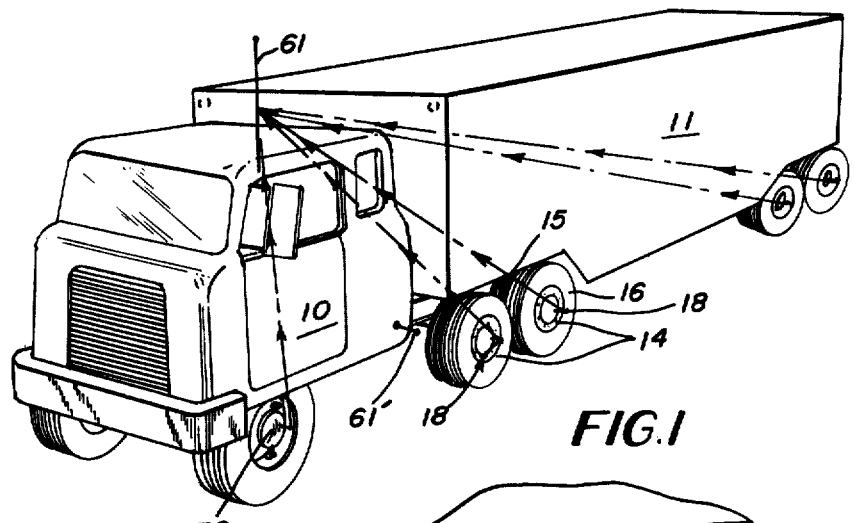
FIG. 1 is a front and left side perspective view of a tractor-trailer vehicle having dual wheels carrying the alarm system, made in accordance with this invention.

Referring now to the drawings in more detail, FIG. 1 discloses a motor vehicle tractor 10 and a trailer 11 supported by dual wheels 13 and 14 (FIG. 4) carrying an inboard tire 15 and an outboard tire 16, respectively. Mounted on each of the outboard wheels 14 is a low tire pressure detector device 18, made in accordance with this invention.

Figure 6:
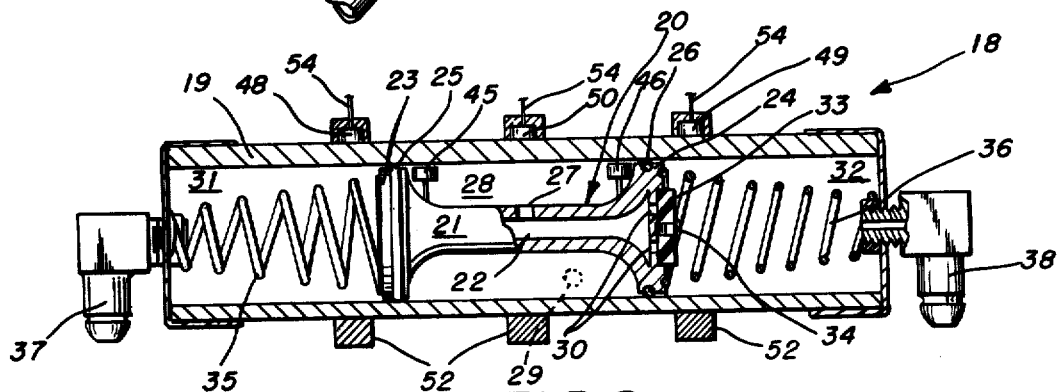
FIG. 6 is a section, taken along the line 6—6 of FIG. 5, with the piston member shown partially in section, and in a neutral position.
Figure 7:
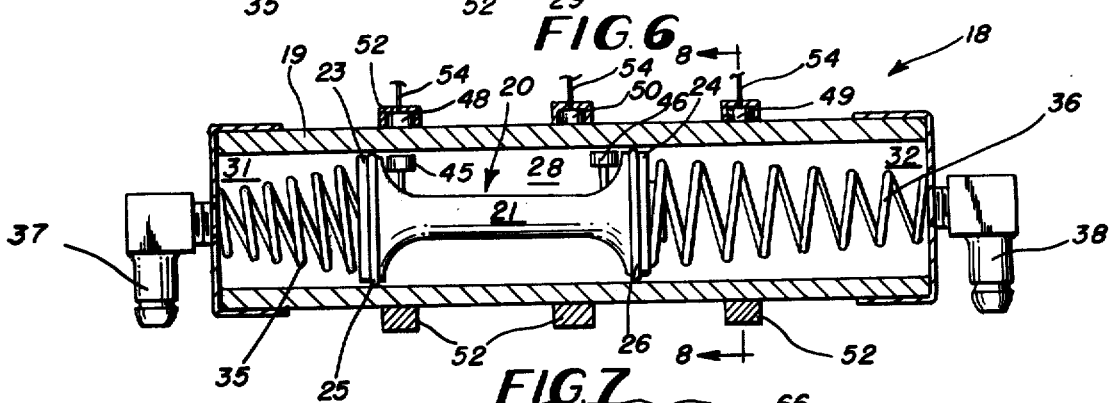
FIG. 7 is a view similar to FIG. 6, illustrating the piston member shifted to the left and the switch elements in an operative position for indicating low pressure in an outboard tire of a dual vehicle wheel.

The detector device 18, as best disclosed in FIGS. 6 and 7, includes an elongated pneumatic cylinder 19 within which is reciprocally mounted an elongated piston member 20, of substantially lesser length than the cylinder 19.

The piston member 20 is preferably spool-shaped having an elongated body portion 21 of substantially less diameter than the interior diameter of the cylinder 19, having a hollow interior chamber 22, and terminating at its opposite ends in a first or left piston head 23 and a second or right piston head 24. Each piston head 23 and 24 is surrounded by an O-ring 25 and 26, respectively, to permit slidable, but sealing, engagement between each piston head and the interior wall of the cylinder 19.

Figure 5:
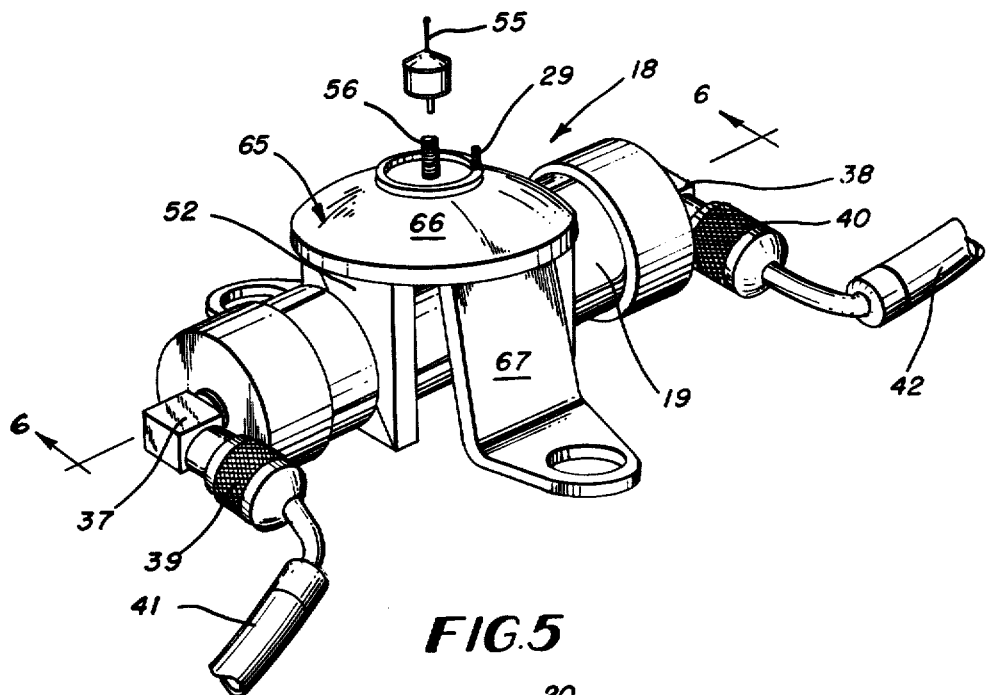
FIG. 5 is an enlarged perspective view of the detector device made in accordance with this invention.

The hollow interior chamber 22 of the plunger member 20 communicates through an inlet port 27 with an intermediate air intake chamber 28 within the cylinder 19, and in turn communicating with an air intake valve 29 projecting upward from the cylinder 19, as best disclosed in FIG. 5 and as indicated in phantom in FIG. 6.

Outlet air holes 30 are formed in each of the piston heads 23 and 24 to provide fluid communication between the interior chamber 22 and the detector air chambers 31 and 32 defined by the opposite end portions of the cylinder 19 and the outer faces of the piston heads 23 and 24. A flexible diaphragm valve 33 is secured by bolt 34 to the end of each of the piston heads 23 and 24 and is adapted to normally cover the outlet ports 30, to function as a one-way or check valve. The diaphragm check valves 33 function to permit the flow of air under pressure from the interior chamber 22 into the corresponding detector chambers 31 and 32, but will prevent reverse flow from the detector chambers back into the interior chamber 22.

Coil springs 35 and 36 are disposed in each of the detector chambers 31 and 32, having their outer ends seated against the end walls of the pneumatic cylinder 19, and their inner ends seated against the outer faces of the respective piston heads 23 and 24. The springs 35 and 36 are biased and of sufficient strength and elasticity to maintain the piston member 20 in its central, neutral or inoperative position, when there is equal air pressure within the detector chambers 31 and 32, as disclosed in FIG. 6. Thus, when both the inboard tire 15 and the outboard tire 16 are under equal and normal air pressure, the piston member 20 will rest in its neutral position disclosed in FIG. 6.

Connected to each end wall of the cylinder 19 and in fluid communication with the corresponding detector air chambers 31 and 32 are a pair of L-shaped nipples 37 and 38, to which are connected couplings 39 and 40, respectively, to flexible hoses 41 and 42, the opposite ends of which are coupled to existing tire valves 43 and 44, in the respective inboard tire 15 and outboard tire 16.

Fixed to the piston body member 21 adjacent the piston head 23 is a first movable switch element, specifically a magnet 45. A similar or second switch element, or magnet 46, is fixed to the body member 21, adjacent the opposite piston head 24, and in longitudinal or axial alignment with the first switch element 45. The switch elements 45 and 46 move with the reciprocable member 20.

Fixed to the exterior surface of the pneumatic cylinder 19 are a plurality of, three as shown in the drawings, opposing switch elements 48, 49, and 50, more specifically solid-state, proximity switches, each being adapted to be actuated by the proximity of a movable switch element or magnet 45 or 46 as the switch element 45 or 46 moves axially until it is in substantially radial alignment with a corresponding switch element 48, 49, or 50. In a preferred from of the invention, the switch elements 48, 49 and 50 are "Micro Switch" proximity Hall Effect switches. The proximity switches 48, 49, and 50 are held in their fixed positions upon the cylinder 19 by the clamp blocks 52 (FIGS. 5–8).

Figure 4:
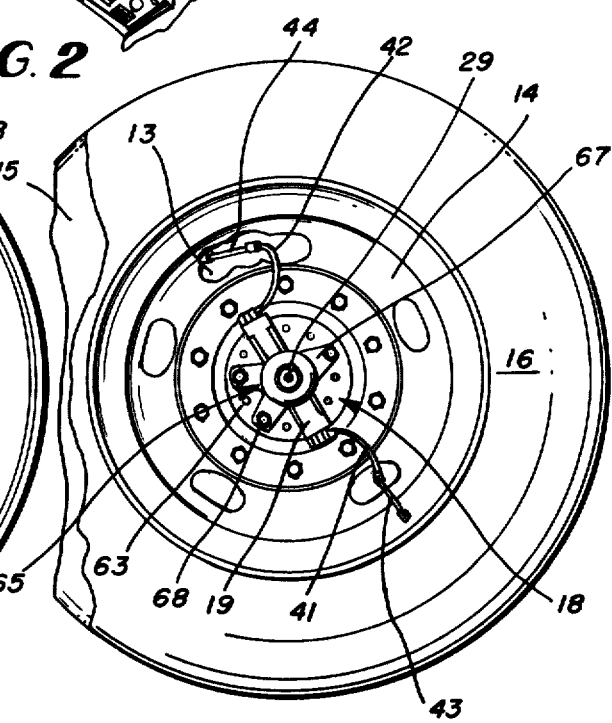
FIG. 4 is a fragmentary view similar to FIG. 3, with the hubcap removed.

The detector device 18 is fixed to the central hub 63 of the outboard wheel 14 in such a manner, that the longitudinal axis of the cylinder 19 is disposed diametrically of the hub 63 or the outboard wheel 14. The detector device 18 is fixed to the hub 63 by means of a mounting bracket, such as the bracket 65, including a dish-shaped base 66, and tripod legs 67, secured by bolts 68 to the hub 63, as illustrated in FIG. 4. The base 66 may include the depending clamp members or blocks 52 attached to the cylinder 19. The bracket 65 not only maintains the detector device 18 in a diametrical attitude upon the hub 63, but also locates the cylinder 19 centrally of the hub in such a manner that all of the elements forming a part of the device 18 are substantially in concentric balance relative to the rotary axis of the wheel 14 in order to minimize the effects of centrifugal force upon the detector device 18 as the wheel 14 rotates.

Figure 8:
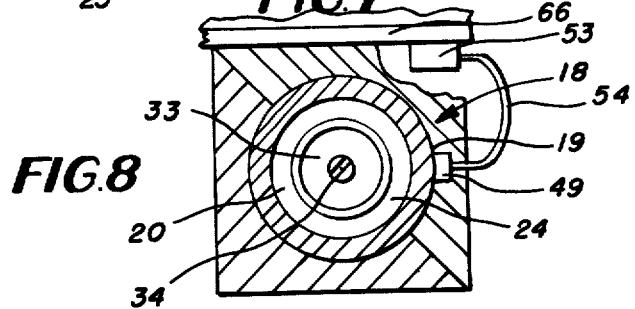
FIG. 8 is a section, taken along the line 8—8 of FIG. 7.

A small radio transmitter 53 of conventional design may be carried by the mounting bracket 65, such as in the position disclosed in FIG. 8 beneath the base 66. The transmitter 53 is connected to the fixed proximity switches 48, 49, and 50 by leads 54. The transmitter 53 is in turn connected by a lead, not shown, to its antenna 55 secured by threaded coupler or bolt 56 to the top of the hubcap or cover 70 and to the base 66. As a matter of fact, the threaded coupler 56 and the screw-on antenna 55 function to hold the hubcap 70 upon the base 66.

Figure 2:
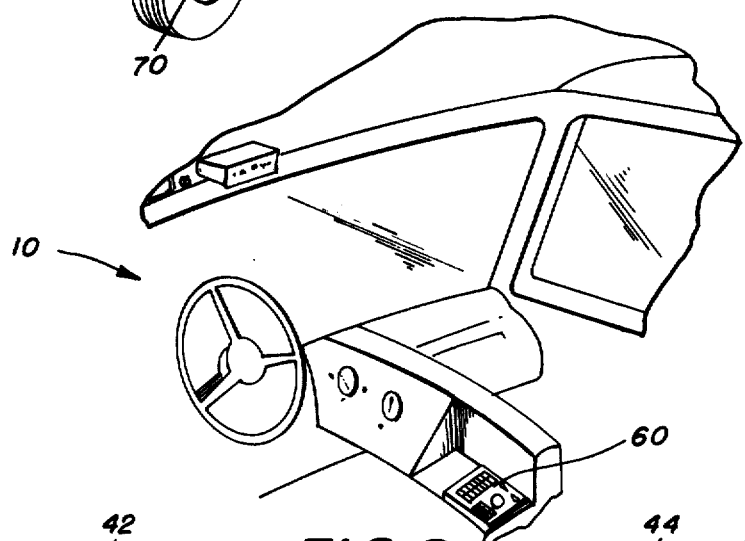
FIG. 2 is an enlarged, fragmentary, perspective view of the interior of the tractor cab, disclosing the receiver set for the alarm system.

A radio receiver unit 60 is mounted in the cab of the tractor 10, as illustrated in FIGS. 1 and 2. The radio receiver unit 60 is connected to a receiver antenna 61 mounted on the top of the cab of the tractor 10, as illustrated in FIG. 1 for receiving radio signals from the radio transmitter antennae 55. An alternate receiver antenna 61' is shown in FIG. 1. The radio receiver unit 60 is also provided with a visual display panel for displaying different colored lights corresponding to the frequency of the signal transmitted from the corresponding proximity switches 48, 49, or 50. The radio receiver unit 60 may also be provided with an audible alarm device which may be actuated upon receipt of a radio signal from any of the transmitting proximity switches 48, 49, or 50, or the audible signal may vary in tone corresponding to particular frequency of the proximity switch 48, 49, or 50.

With the detector device 18 fixedly mounted upon the hub 63 of an outboard wheel 14, the piston member 20 is normally maintained in its central neutral position disclosed in FIG. 6, as long as the air pressure within the inboard and outboard tires 15 and 16 remain equal and normal and at their normal predetermined pressures.

After the detector device 18 has been securely fixed to the hub 63 by the bracket 65, the hoses 41 and 42 are coupled to the respective outboard and inboard tire valves 43 and 44, and the receiver set 60 is turned on.

As long as the normal pressure is maintained in the inboard and outboard tires 15 and 16, the piston member 20 will remain in its neutral position, as disclosed in FIG. 6, regardless of the length of travel or speed of the tractor-trailer vehicle 10-11.

However, when either tire, such as the outboard tire 16, loses pressure, the greater pressure in the right detector chamber 32 causes the piston member 20 to move toward the left in FIGS. 6 and 7, because of the reduced air pressure within the detector chamber 31. When the pressure has been reduced to a value which permits the first magnet element 45 to move into an operative position in registry with the proximity switch 48, such as the position disclosed in FIG. 7, then the proximity switch 48 will be energized to generate and transmit an electrical signal of a predetermined frequency to the radio transmitter 43. The transmitter antenna 55 then transmits a radio signal corresponding to a predetermined value of reduced pressure in the tire 16, to the radio receiver unit 60. A corresponding visual display, and optionally, an audible signal, is emitted from the radio receiver unit 60 to alert the driver of the tractor 10 of the loss of pressure in that particular tire.

As illustrated in FIG. 1, each one of the dual tires 15 and 16 is preferably provided with one of the detector units 18, each of which will have its own radio signal frequency to actuate a corresponding display in the radio receiver unit 60 to indicate the location of the malfunctioning tire.

If the reduction in air pressure is rather rapid or the operator does not immediately notice the low pressure reading created by the signal from the transmitter 48, then the piston member 20 will continue movement toward the left until the second or trailing magnet switch 46 is radially aligned, or substantially radially aligned, with the intermediate proximity switch 50. The actuation of the proximity switch 50 produces or generates another radio signal of a different frequency which will produce a visual display in the radio receiver unit indicating a dangerous condition or an abnormally low pressure in this particular outboard tire 16.

If the inboard tire 15 loses pressure, instead of the outboard tire 16, then the piston member 20 is moved toward the right of the cylinder 19 as displayed in FIGS. 6 and 7 to produce a first low pressure signal when the second magnet 46 (now the leading magnet) substantially radially aligned with the proximity switch 49. For an abnormally low pressure reading for the inboard tire 15, the movement of the piston member 20 toward the right will permit the first magnet 45 (now the trailing magnet) to become substantially radially aligned with the proximity switch 50 to again produce a radio signal of a different frequency indicating a dangerously low air pressure within the inboard tire 15.

It will be understood that other types of switches might be utilized instead of the magnet and proximity switches previously described, for example conductor switches, without departing from the spirit of this invention.

Figure 3:
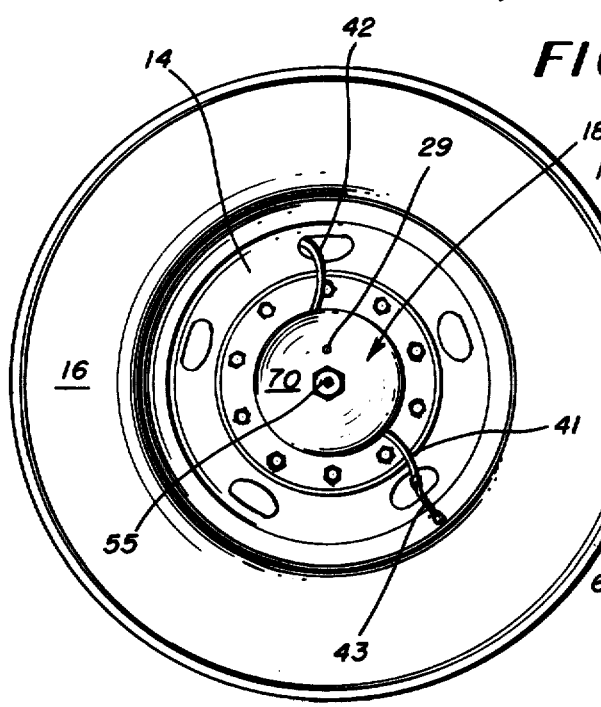
FIG. 3 is an outboard side elevation of a dual tractor wheel upon which the tire pressure detector device is mounted.

As best illustrated in FIGS. 1 and 3, a polished dome-shaped hubcap 70 may be secured concentrically to the base 66 of the bracket 65 by the antenna 55 and threaded coupler or bolt 56, or any other type of fastener or securing means. The hubcap 70 is provided with one hole which permits the threaded bolt 56 to extend therethrough, and another hole for the protrusion therethrough of the air intake valve 29, as best illustrated in FIG. 3.

What is claimed is:

1. An alarm system for monitoring the air pressure in each of the pneumatic tires on a pair of coaxial dual inboard and outboard vehicle wheels, the outboard wheel having a hub, and inboard and outboard air valves in fluid communication with the interior of each corresponding tire, comprising:
   (a) a pneumatic cylinder,
   (b) a piston reciprocably mounted in said cylinder and defining an inboard detector chamber in one end of said cylinder on one side of said piston and an outboard detector chamber in the other end of said cylinder on the other side of said piston member,
   (c) an inboard fluid conduit coupled in fluid communication between said inboard detector chamber and the inboard air valve,
   (d) an outboard fluid conduit coupled in fluid communication between said outboard detector chamber and the outboard air valve,
   (e) a sensor comprising first and second axially spaced movable switch elements movable with said piston, and first and second fixed switch elements axially spaced on said cylinder and in alignment with the reciprocal path of said movable switch elements,
   (f) signal generating means associated with said sensor and being adapted to generate a first alarm signal when said first movable and fixed switch elements are adjacent each other in a first operative position when the pressure in said inboard detector chamber is less than a predetermined value, and to generate a second alarm signal when said second movable and fixed switch elements are adjacent each other in a second operative position when the air pressure in said outboard detector chamber is less than a predetermined value,
   (g) an alarm device adapted to be actuated by either said first or second alarm signals to indicate corresponding low pressure in the inboard tire or the outboard tire, and
   (h) mounting means mounting said cylinder on the hub of a vehicle wheel, so that the mass of said cylinder, said piston and said switch elements is substantially equally distributed concentrically of the hub.

2. The invention according to claim 1 further comprising a third fixed switch element mounted on said cylinder between said first and second fixed switch elements and in substantial alignment with the path of travel of said first and second movable switch elements, said third fixed switch element being connected to said signal generating means for producing a third alarm signal when either of said first or second movable switch elements moves to an operative position adjacent said third fixed switch element to indicate the air pressure in said corresponding outboard or inboard detector chambers, respectively, is less than the value of the air pressure corresponding to said first or second alarm signal.

3. The invention according to claim 1 further comprising spring means normally urging said piston member to a central position in said cylinder in which said first and second movable switch elements are in their inoperative positions between adjacent fixed switch elements.

4. The invention according to claim 1 in which said piston member comprises an elongated hollow body member of lesser diameter than said cylinder and terminating in first and second piston heads slidably but sealingly engaging the inner wall of said cylinder to define said inboard and outboard detector chambers outside said first and second piston heads, respectively, and an intermediate air intake chamber between said piston heads, an inlet port in said elongated body member in communication with said air intake chamber, air outlet ports through said piston heads in communication between the hollow portion of said body member and said respective inboard and outboard detector chambers, and first and second check valves, respectively, closing said air outlet ports in said first and second piston heads to permit the flow of air only from the hollow interior portion of said body member outward into said inboard and outboard detector chambers.

5. The invention according to claim 1 in which said mounting means comprises a mounting bracket attaching said cylinder to the hub of the outboard wheel, the longitudinal axis of said cylinder being disposed diametrically of said hub.

6. The invention according to claim 2 in which the spacing between said first and second movable switch elements is greater than the spacing between said first and third fixed switch elements and the spacing between said second and third fixed switch elements.

* * * * *

UNITED STATES PATENT AND TRADEMARK OFFICE
CERTIFICATE OF CORRECTION

PATENT NO. : 4,468,650

DATED : August 28, 1984

INVENTOR(S) : J. Brent Barbee

It is certified that error appears in the above-identified patent and that said Letters Patent are hereby corrected as shown below:

On the cover sheet, delete--Assignee: Kanetsu Kogyo Kabushiki Kaisha, Nagono, Japan--

Signed and Sealed this

Fifteenth Day of October 1985

[SEAL]

Attest:

Attesting Officer

DONALD J. QUIGG

Commissioner of Patents and Trademarks—Designate